United States Patent [19]

Townsend

[11] Patent Number: 5,025,560

[45] Date of Patent: Jun. 25, 1991

[54] ERGONOMIC KNIFE

[75] Inventor: Ray T. Townsend, Des Moines, Iowa

[73] Assignee: Townsend Engineering Company, Des Moines, Iowa

[21] Appl. No.: 426,019

[22] Filed: Oct. 24, 1989

[51] Int. Cl.⁵ .................. B26B 3/00; B26B 19/00; B26B 13/00
[52] U.S. Cl. ..................................... 30/298; 30/198; 30/232
[58] Field of Search .................. 30/323, 299, 298, 232, 30/291, 198, 169, 340; 294/25, 118; 224/218, 219, 267

[56] References Cited

U.S. PATENT DOCUMENTS

| D. 136,910 | 12/1943 | Cosneck | 30/298 |
| 70,861 | 11/1867 | Kingsley | 30/198 |
| 496,521 | 5/1893 | Low | 30/298 |
| 670,023 | 3/1901 | Jump | 294/25 |
| 972,187 | 10/1910 | Hanson | 30/298 |
| 3,781,052 | 12/1973 | Millington | 30/232 |
| 4,613,179 | 9/1986 | van Zelm | 294/25 |

FOREIGN PATENT DOCUMENTS 51994 11/1889 Fed. Rep. of Germany ........ 30/298

Primary Examiner—Douglas D. Watts
Assistant Examiner—Paul M. Heyrana, Sr.
Attorney, Agent, or Firm—Zarley, McKee, Thomte, Voorhees & Sease

[57] ABSTRACT

An ergonomic hand tool of this invention comprises an elongated support bar adapted to be positioned adjacent the forearm and wrist of the wearer. The support bar has forward and rearward ends with the forward end being adjacent the wrist of the wearer. Attachment means are on the support bar for securing it to the forearm and wrist of the wearer. A hand gripping member is pivotally secured to the forward end of the support bar. A locking mechanism is operatively connected to the hand gripping member to selectively lock the hand gripping member in a predetermined position with respect to the support bar. A tool member, such as an elongated knife, is secured to the hand gripping member. The hand gripping member has a plurality of finger gripping portions thereon. The locking means includes a spring coil operatively connected to a thumb actuated lever on the hand gripping member.

20 Claims, 2 Drawing Sheets

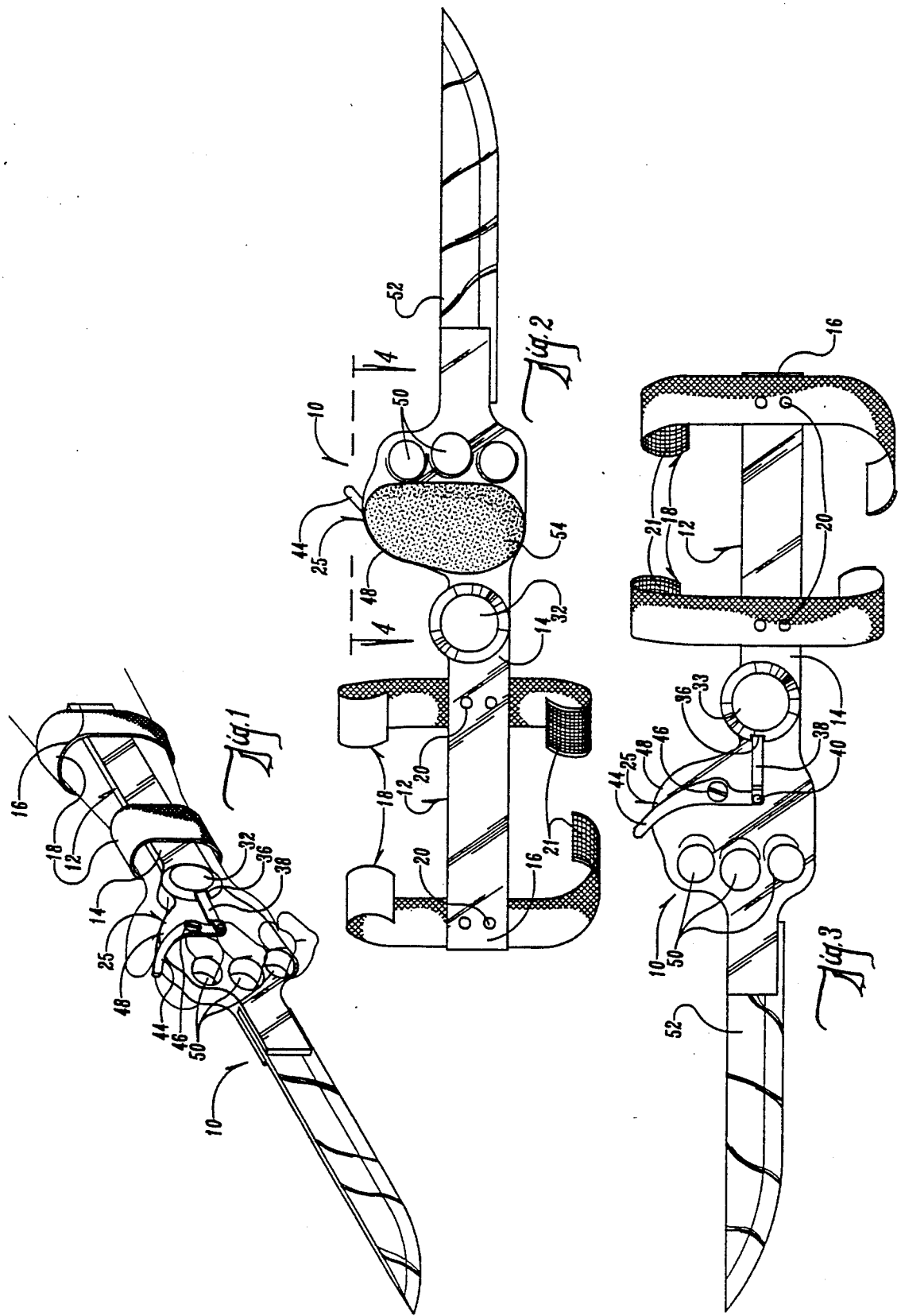

ERGONOMIC KNIFE

BACKGROUND OF THE INVENTION

Some medical studies have suggested that certain repetitive hand and wrist activities, such as the use of hand knives in the meat industry, have created the carpal tunnel syndrome. This syndrome exists when the cartilage and bone in the wrist will gradually close or reduce the tunnel through the wrist so that the nerves running through the tunnel are pinched.

It is therefore a principal object of this invention to provide an ergonomic hand tool which will put less strain on the wrist in repetitive use.

A further object of this invention is to provide an ergonomic hand tool which is partially supported by the wrist and forearm but which is also able to move or point the knife or tool in any direction.

A further object of this invention is to provide an ergonomic knife with an extended support member that reaches part way up the forearm and is attached to the forearm so that any downward force on the knife blade can be imposed on the sturdy bone of the forearm to relieve stress on the wrist.

A further object of this invention is to provide an ergonomic tool wherein the tool can be moved to any attitude with respect to the support member on the forearm of the wearer and selectively locked in any desired position.

These and other objects will be apparent to those skilled in the art.

SUMMARY OF THE INVENTION

An ergonomic hand tool of this invention comprises an elongated support bar adapted to be positioned adjacent the forearm and wrist of the wearer. The support bar has forward and rearward ends with the forward end being adjacent the wrist of the wearer. Attachment means are on the support bar for securing it to the forearm and wrist of the wearer.

A hand gripping member is pivotally secured to the forward end of the support bar. A locking mechanism is operatively connected to the hand gripping member to selectively lock the hand gripping member in a predetermined position with respect to the support bar. A tool member, such as an elongated knife, is secured to the hand gripping member.

The hand gripping member has a plurality of finger gripping portions thereon. The locking means includes a spring coil clutch operatively connected to a thumb actuated lever on the hand gripping member.

BRIEF DESCRIPTION OF THE DRAWINGS

FIG. 1 is a perspective view of an ergonomic hand tool mounted on the hand of an operator;

FIG. 2 is an enlarged elevational view of the tool of FIG. 1 showing the side of the tool that embraces the palm and inner forearm of the wearer;

FIG. 3 is an elevational view opposite to that shown in FIG. 2;

DESCRIPTION OF THE PREFERRED EMBODIMENT

Figure 4:
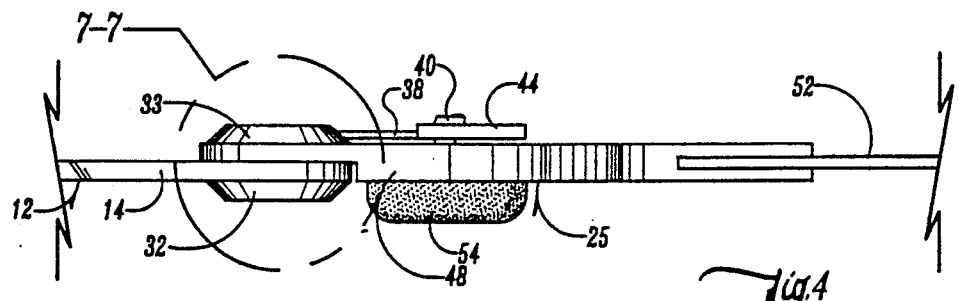
FIG. 4 is a partial plan view at a reduced scale taken on line 4—4, FIG. 2.
Figure 5:
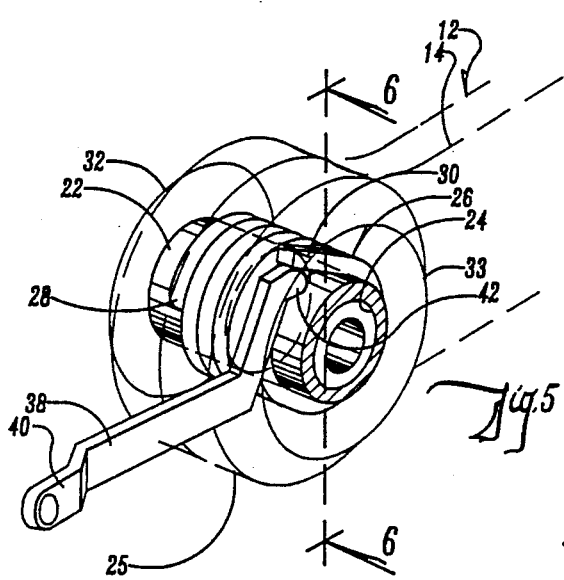
FIG. 5 is an enlarged partial perspective view of the clutch mechanism of this invention.

The ergonomic knife 10 includes an elongated support bar 12 having a forward end 14 and a rearward end 16. Support bar 12 is adapted to be positioned against the inner forearm and wrist of the operator. Attachment bands 18 are secured by rivets 20 to support bar 12. Conventional velcro fasteners 20 are positioned on the ends of bands 18 to affix the support bar to the wrist and forearm of the wearer.

A stub shaft 22 is rigidly secured to support bar 12 and extends laterally therefrom through aperture 24 in hand gripping member 25. A circular clutch spring 26 having an inner end 28 and an outer end 30 encircles shafts 22 and 22A. The outer end of shaft 22 is of reduced diameter, and extends into hollow shaft 22A. Inner end 28 is rigidly secured to stub shaft 22 such as being inserted into a suitable aperture 31 in the stub shaft.

Figure 6:
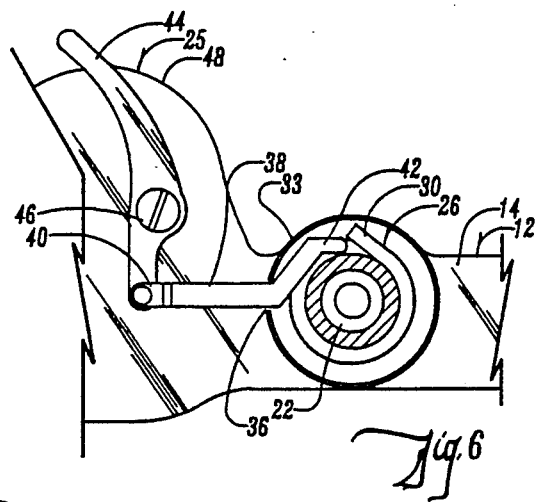
FIG. 6 is a partial sectional view of the clutch mechanism 7.
Figure 7:
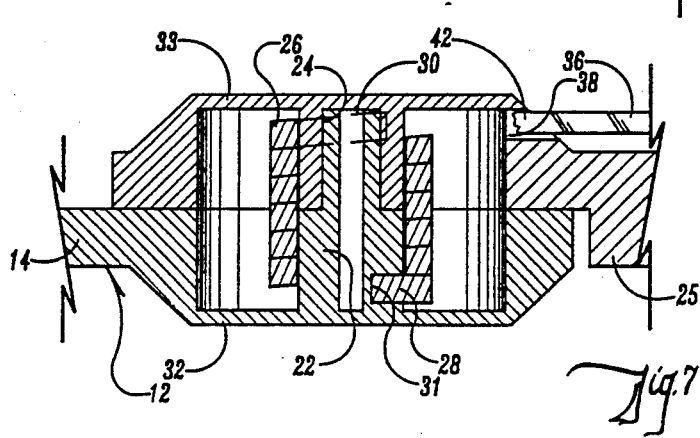
FIG. 7 is a partial sectional view at an enlarged scale taken on line 7—7 of FIG. 4.

Circular covers 32 and 33 are mounted on opposite sides of support bar 12 and hand gripping member 25 and are held in place in any convenient manner. Cover 33 has an opening 36 therein which receives the rearward end of linkage arm 38. Linkage arm 38 has forward end 40 and rearward end 42 (FIG. 6). The forward end 40 thereof is pivotally secured by any convenient means to the lower end of lever 44 (FIGS. 3 and 6). Lever 44 is pivotally secured by screw 46 to a lateral side of the hand gripping member 25.

Hand gripping member 25 has a shoulder 48 extending in an upwardly direction, with a plurality of lateral extended apertures 50 which are adapted to receive the first three fingers of the wearers hand. The shoulder 48 serves as a gripping surface with the thumb of the operator extending above or to one side thereof, much like the grip on a hand gun. The upper end of the lever 44 extends above shoulder 48 to permit the thumb of the operator to easily engage the upper end of the lever.

An elongated knife 52 is secured in any convenient means to the forward end of the hand gripping member 25.

The clutch spring 26 is of conventional construction, and does not of itself comprise the instant invention. When the clutch spring and the linkage arm 38 are in the position of FIG. 6, the inherent torsional force on the clutch spring 26 holds the shafts 22 and 22A together, which holds support bar 12 and the hand gripping member in rigid connection. However, when the thumb of the operator moves the lever 44 in a forward or counter clockwise direction as viewed in FIG. 6, lever 44 pivots about screw 46 to move the rearward end 42 of linkage arm 38 into engagement with the end 30 of clutch spring 26 to "open" the spring. This disengages shafts 22 and 22A, and permits the operator to move the hand gripping member at an angle with respect to the support bar 12 about the pivotal axis of shafts 22 and 22A. When lever 44 is released so that the end 42 of linkage arm 38 disengages the end 30 of clutch spring 26, spring 26 reconnects shafts 22 and 22A, and the support bar 12 and the hand gripping member 25 have their rigid interconnection reestablished.

From the foregoing, it can be seen that the knife 52 can be placed in any desired pivotal attitude with respect to the support bar 12. Pressure exerted on the knife in the normal cutting operation is transmitted through the gripping member to the support bar 12, and fenced to the forearm of the operator through the attachment bands 18.

A resilient pad 54 can be attached to a lateral side of the hand gripping member 25 to receive the palm of the wearers hand to add to the comfort of the wearer as the knife is being used.

It is therefore seen that this invention will achieve at least all of its stated objectives.

We claim:

1. A hand tool, comprising an elongated rigid support bar
   having forward and
   rearward ends, means on said support bar for securing it to the forearm and
   wrist of the wearer, a hand gripping member pivotally secured to the forward end of
   said support bar,
   locking means on said hand tool to selectively rigidly lock said hand gripping member in a predetermined pivotal position with respect to said support bar.
2. The device of claim 1 wherein said hand gripping member has a plurality of finger gripping portions.
3. The device of claim 2 wherein said finger gripping portions are laterally extending apertures.
4. The device of claim 2 wherein a palm pad is secured to one lateral side of said hand gripping member.
5. The device of claim 1 wherein locking means is mounted on said hand gripping member.
6. The device of claim 5 wherein said locking means includes a lever pivotally mounted on said hand gripping member.
7. The device of claim 6 wherein a palm pad is secured to one lateral side of said hand gripping member.
8. The device of claim 6 wherein said locking means includes a releasable clutch means.
9. The device of claim 8 wherein a linkage means connects said lever and said clutch means.
10. The device of claim 6 wherein said lever extends upwardly to be engagable by the thumb of the operator's hand which holds said hand gripping member.
11. The device of claim 1 wherein said hand gripping member is pivotally secured to said support bar about a horizontal transverse axis.
12. The device of claim 1 wherein said locking means includes a releasable clutch means.
13. The device of claim 1 wherein said tool member is an elongated knife element.
14. The device of claim 1 wherein a palm pad is secured to one lateral side of said hand gripping member.
15. The device of claim 1 wherein a tool member is secured to said hand gripping member.
16. A hand tool, comprising
    an elongated support bar having forward and rearward ends,
    means on said support bar for securing it to the forearm and wrist of the wearer,
    a hand gripping member pivotally secured to the forward end of said support bar,
    locking means on said hand tool to selectively lock said hand gripping member in a predetermined position with respect to said support bar,
    said locking means being mounted on said hand gripping member and including a lever pivotally mounted on said hand gripping member.
17. The device of claim 16 wherein said lever extends upwardly to be engageable by the thumb of the operator's hand which holds said hand gripping member.
18. A hand tool, comprising
    an elongated support bar having forward and rearward ends,
    means on said support bar for securing it to the forearm and wrist of the wearer,
    a hand gripping member pivotally secured to the forward end of said support bar,
    locking means on said hand tool to selectively lock said hand gripping member in a predetermined position with respect to said support bar, said locking means including a releasable clutch means.
19. A hand tool, comprising
    an elongated support bar having forward and rearward ends,
    means on said support bar for securing it to the forearm and wrist of the wearer,
    a hand gripping member pivotally secured to the forward end of said support bar,
    locking means on said hand tool to selectively lock said hand gripping member in a predetermined position with respect to said support bar,
    said locking means including a lever pivotally mounted on said hand gripping member, and including a releasable clutch means.
20. The device of claim 18 wherein a linkage means connects said lever and said clutch means.

* * * * *